Oct. 31, 1950 E. PETERSON 2,527,649

SYNCHRONIZATION OF PULSE TRANSMISSION SYSTEMS

Filed Feb. 18, 1949 4 Sheets-Sheet 1

INVENTOR
E. PETERSON
BY Harry C. Hart
ATTORNEY

SYNCHRONIZATION OF PULSE TRANSMISSION SYSTEMS

Filed Feb. 18, 1949

INVENTOR
E. PETERSON
BY Harry C. Hart
ATTORNEY

INVENTOR
E. PETERSON
BY Harry C. Hart
ATTORNEY

Oct. 31, 1950 E. PETERSON 2,527,649

SYNCHRONIZATION OF PULSE TRANSMISSION SYSTEMS

Filed Feb. 18, 1949 4 Sheets-Sheet 4

INVENTOR
E. PETERSON
BY Harry C. Hart
ATTORNEY

Patented Oct. 31, 1950

2,527,649

UNITED STATES PATENT OFFICE 2,527,649

SYNCHRONIZATION OF PULSE TRANSMISSION SYSTEMS

Eugene Peterson, New York, N. Y., assignor to Bell Telephone Laboratories, Incorporated, New York, N. Y., a corporation of New York Application February 18, 1949, Serial No. 77,165

12 Claims. (Cl. 179—15)

This invention relates to communication by pulse code transmission and particularly to the synchronization of receiver apparatus with transmitter apparatus.

A pulse code transmission system is one in which instantaneous amplitude values or "samples" of a message, for example the voice wave of a telephone conversation originating at a transmitter station, are translated into code pulse groups, transmitted in that form to a receiver station, and there decoded or translated into the original message form for delivery to the listener. Such systems have certain known advantages as compared with more conventional systems, among which are their remarkable freedom from interference and their easy adaptability to multiplexing by time division. However, for correct reconstitution of a message and, in the case of a time division multiplex system for correct distribution of the several messages among the several listeners, the receiver apparatus must operate in substantially perfect synchronism with the transmitter apparatus; i. e., it must operate not only at the same frequency or speed, but it must also maintain a preassigned phase relation to a very precise degree. To this end it is known to transmit, in addition to the message information, certain synchronizing information, for example in the form of marker pulses recurring in a preassigned sequence, which hold the receiver apparatus in step with the transmitter apparatus at the correct frequency and in the correct phase or angular alignment. It is also a most desirable feature that the receiver apparatus shall return to correct alignment with the transmitter apparatus, after a momentary interruption of the service, as rapidly as possible. One obvious expedient for securing this result involves the provision, at the receiver, of timing apparatus such as a multivibrator circuit whose natural frequency is slightly lower than that of corresponding timing apparatus at the transmitter, yet not so low but that it can be held in step with the transmitter apparatus. When the phases are correct, the receiver remains locked in step with the transmitter as by the application of the transmitted marker pulses to the receiver timing apparatus. When for any reason the phases are not correct, as for example, when the system is first put in operation or after an accidental interruption of service, the receiver timing apparatus runs at its lower natural frequency so that its phase lag with respect to the transmitter apparatus increases continuously until alignment is once more obtained, at which time the marker pulse, if sufficiently strong, seizes control and holds the receiver in step with the transmitter. Thereupon synchronous operation recommences.

The design of a system of that kind involves making a compromise between two incompatibles. For certainty of locking in step after a temporary drop-out, the frequency difference between the transmitted pulsing frequency and the free-running frequency of the receiver multivibrator must be small, and the synchronizing or marking pulse must be strong. This means a slow receiver drift during the drop-out and the allotment of a substantial amount of frequency space to the synchronizing pulses. If an effort be made to conserve frequency space by weakening the synchronizing pulses or to reduce drifting time by increasing the multivibrator frequency difference, then there arises the possibility of an overshoot with resulting loss of time.

In an application of J. G. Kreer and E. Peterson, Serial No. 776,280, filed September 26, 1947, there is described a system which avoids these difficulties, providing secure restoration of synchronism after it has once been lost by a drop-out or interruption of service or otherwise. In that system a rotative member of the receiver apparatus, for example a ring circuit of intercoupled multivibrators, is never allowed to drift, but is held locked in synchronism at all times with a sequence of pulses applied to it. Normally, the pulses of this sequence recur at the basic pulse repetition rate of the system; but when the receiver is out of synchronism, one pulse in a specified number is skipped, blocked, or suppressed. This allows the receiver to drop back substantially instantaneously by one step, and so avoids the danger of any overshoot. Restoration of synchronism thus takes place in a time which, in a simplex system or a multiplex system of a small number of channels, for example 12 or less, is negligibly small. But with a multiplex system having a number of channels of the order of 100 or so, the time consumed in restoration of synchronism may be excessive. For example, with a system of 100 channels, each employing pulse transmission in the 7-digit code, there are 700 pulse positions in each frame, one of which is the marker pulse and is assigned for phase alignment purposes. It has been found that if the marker pulses are to be distinguished from message pulses with certainty, the pulse-suppression process cannot safely be carried out more than once in about 10 successive frames, so that, as a result, only one pulse out of 7,000 pulses is skipped or suppressed. Inevitably, therefore, in a large scale time division multiplex system, restoration of synchronism by this method is slow.

It is a principal object of the present invention to accelerate the reestablishment of synchronous operation of a pulse code communication receiver with its transmitter after it has once been lost. This object is attained, in accordance with the invention in one of its forms, by the inclusion in the pulse train as generated at the transmitter of a plurality of distinct and distinguishable marker pulses which are interspersed among the message pulses in each frame. Preferably they are evenly spaced apart, thus occuring at the starting instants of equal fractions of the full frame cycle. Preferably, too, they are so located on the time scale as to replace message code pulses whose loss will result in a minimum of degradation of the received message. They may be distinguished from one another in various ways, a preferred way, especially for the purposes of pulse code communication, being by reason of their repetition rate, in which case they may be otherwise identical in character with the message-carrying pulses. Thus the first marker pulse may recur regularly in alternate frames. With a basic frame frequency of 8 kilocycles per second, the frequency of this first marker pulse is therefore 4 kilocycles. This marker pulse, which may be denoted the principal marker pulse, may indicate the commencement of the full frame. Similarly the second marker pulse may have a repetition rate of 2 kilocycles per second and may indicate the commencement of the second third of the frame; i. e., it may occur after a frame rotation of 120 degrees. Similarly, again, the third marker pulse may have a basic repetition rate of 1 kilocycle per second, thus recurring once in every eight frames and after the completion of two thirds of the frame cycle; that is, after a phase rotation of 240 degrees.

At the receiver the several distinguishable marker pulses are sorted by suitable recognizing apparatus. For example, when they are distinguished on the basis of their repetition rates, such suitable apparatus comprises a bank of band-pass filters, each of which is tuned to the recurrence rate of one of these marker pulses. A build-up of the output of any one of these filters, or, in general, these marker pulse recognizers, thus indicates that the receiver is displaced in phase from the transmitter by a specified amount, for example, by 120 degrees or by 240 degrees for the second and third marker pulses respectively, or that it is in phase with the transmitter for the first marker pulse. Thus when the first marker pulse recognizer output occurs, the pulse-suppressing mechanism is disabled as described in the aforementioned Kreer-Peterson application, and synchronous operation proceeds. When, however, the second recognizer output builds up, the input driving pulses are blocked from the receiver in an unbroken sequence of specified length, thus effecting a pause in the rotation of the rotative member which endures for just such a time as is required for a phase advance by the transmitter of 240 degrees, thus rapidly bringing the transmitter into phase alignment with the receiver, whereupon synchronous operation recommences. Again, when the output of the third marker pulse recognizer builds up, another unbroken sequence of input pulses, of different length from the first, is suppressed, thus effecting a pause in the rotation of the receiver of a duration equal to that required for a phase advance by the transmitter of 120 degrees, thus again allowing the transmitter to come rapidly into phase alignment with the receiver, whereupon synchronous operation recommences.

With this system the hunting process on the basis of one skipped pulse in each 10 frames is restricted to one third of a frame, at most. As a result, a large fraction of the time consumed in the restoration of synchronism with the apparatus of the aforementioned application of J. G. Kreer and E. Peterson is economized.

Apparatus by which these operations may be carried out comprises multivibrators which deliver output pulses of appropriate duration, each of the multivibrators being triggered, or otherwise started, by the output of one of the recognizers. The multivibrator pulse outputs in turn, operate clamp circuits or switches which suppress the train of the input pulses from the receiver timing mechanism.

In accordance with another form of the invention, the necessity for a plurality of distinct and distinguishable marker pulses included in the incoming pulse train is eliminated. Instead, a plurality of distinct and distinguishable clamping pulses are generated by the receiver apparatus, occurring at instants which are precisely related to the instantaneous phase condition of the rotative member at the receiver. These clamping pulses enable one or other of a plurality of marker pulse recognizers. With but a single marker pulse in the incoming train, for example, a pulse whose basic repetition rate is 4 kilocycles per second, the recognizers may be filters, each of which is tuned to four kilocycles per second. In dependence on the instantaneous phase condition of the receiver with respect to the incoming pulse train, one or other of these marker pulse recognizers is enabled. In the output circuit of each recognizer there is provided a delay generator, for example a single trip multivibrator, whose output pulse is adjusted to an angular length which, with respect to a full revolution, is the complement of the phase displacement of the receiver rotative member at the instant at which the clamping pulse and the marker pulse coincide in time. The output pulses of these several multivibrators are then utilized to block an unbroken sequence of input pulses from the rotative member, thus effecting pauses of suitable duration to bring the rotative member back into phase coincidence and correct phase alignment with the transmitter.

A third form of the invention combines the features of the two forms just described, utilizing both a plurality of clamping pulses which are representative of the phase condition of the receiver and a plurality of distinguishable marker pulses interspersed in the incoming pulse train. The operations and apparatus may be similar, in general, to those above described, with the significant difference that the coincidence in time of any of the clamping pulses with any one of the marker pulses results in the generation of a pause in the rotary advance of the rotative member of a distinctive duration. Thus, for example, with three distinguishable marker pulses and four separate clamping pulses, twelve different values of the resulting generated pause are produced. These are conveniently selected as being of 0 degrees, 30 degrees, 60 degrees, and so up to 330 degrees. Thus the rapid part of the phase lag of the rotative member may amount to all of the required phase lag with the exception of the first 30 degrees; and the slower portion, produced by the intermittent suppression of individual pulses as described in the aforementioned Kreer-Peterson application is thus restricted to no more than a small fraction of the full cycle.

As a further feature, the various values of the required pauses, namely, in the example chosen the various multiples of 30 degrees, may be generated on the decade basis; that is to say by the use of cascaded multivibrators, of which those of the first set may generate pause-producing pulses whose angular durations are zero, 120 degrees, 240 degrees, respectively, while those of the second set produce pulses whose durations are zero, 30 degrees, 60 degrees, and 90 degrees, respectively. By such a cascaded arrangement, the total number of pause-producing multivibrators required is reduced. For example, in the case selected for illustrative purposes, instead of a required 11, 5 different multivibrators suffice.

The invention will be more fully understood from the following description of illustrative embodiments thereof taken in conjunction with the appended drawings in which.

Figure 1:
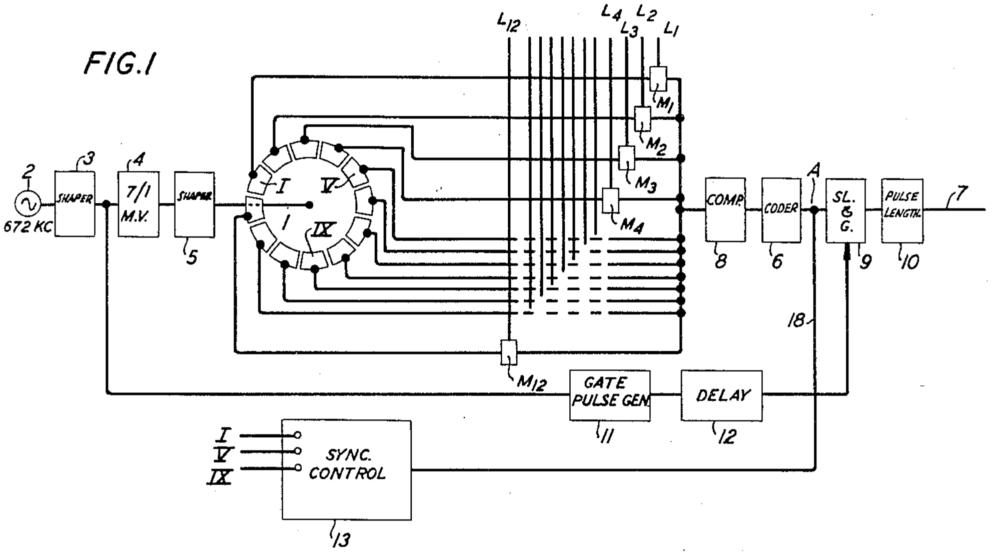
Fig. 1 is a schematic block diagram of transmitter apparatus suitable for use in connection with the invention.

Referring now to the figures:

Fig. 1 shows pulse code transmission apparatus in which provision is made for the generation of distinguishable marker pulses of the several types suitable for use in carrying out the invention in its various forms. The system is an extension of that described in the aforementioned application of E. Peterson and J. G. Kreer to which reference may be made for details. In brief, a number of messages, originating for example with a number of independent talkers such as telephone subscribers, appear on a like number of incoming lines $L_1$ to $L_{12}$, each of which is connected to one of a bank of modulators $M_1$ to $M_{12}$ which are actuated in cyclic serial order by output pulses of a distributor. This distributor may conveniently be a ring circuit 1 of intercoupled multivibrators. It may be driven by a train of pulses whose recurrence rate is the product of the number of channels (in the present example, twelve) by the channel sampling rate, for example 8 kilocycles per second or 96 kilocycles per second. Output pulses of a basic timing source 2 of, for example 672 kilocycles per second are first standardized by a shaper 3 and supplied to a frequency divider 4 for example, a multivibrator which derives pulses at the seventh sub-harmonic of the basic pulse rate. These in turn are standardized by a shaper 5 and applied to the distributor 1. The basic pulse rate, 672 kilocycles, is the product of the sampling rate by the number of channels and by the number of code digits to be employed, e. g. 8 kc.$\times 12 \times 7 = 672$ kc.

The sequential speech samples of the several talkers produced in this manner are then applied to a coder 6 which converts them into binary permutation code pulse groups for transmission, by way of any suitable medium represented by an outgoing line 7, to a receiver station. With the twelve channels assumed, and a seven-digit binary permutation code, there are $12 \times 7 = 84$ such pulse in each full cycle of distributor operation or "frame." To improve the signal-to-noise ratio on the line an amplitude compressor 8 may be interposed ahead of the coder. Individual pulses of the code groups may then be regenerated, as by a slicing and gating circuit 9, to occupy as nearly as possible their correct nominal positions on the time scale, and they may then be lengthened to fill, as nearly as possible, their assigned intervals as by a pulse lengthener 10. This pulse lengthener may be of the type described in G. H. Huber Patent 2,457,559. The slicing and gating operation may be controlled by a gate pulse generator 11 which is driven by the pulses of the basic timing source 2, a suitable delay device 12 being interposed to balance miscellaneous delays in other parts of the system.

One or more marker pulses is interpolated in the outgoing pulse train by injection, for example at the point A. They are generated and timed by the synchronizing control apparatus 13 whose details differ in dependence on the type of receiver which is to be employed. These details will be discussed below.

Figure 2:
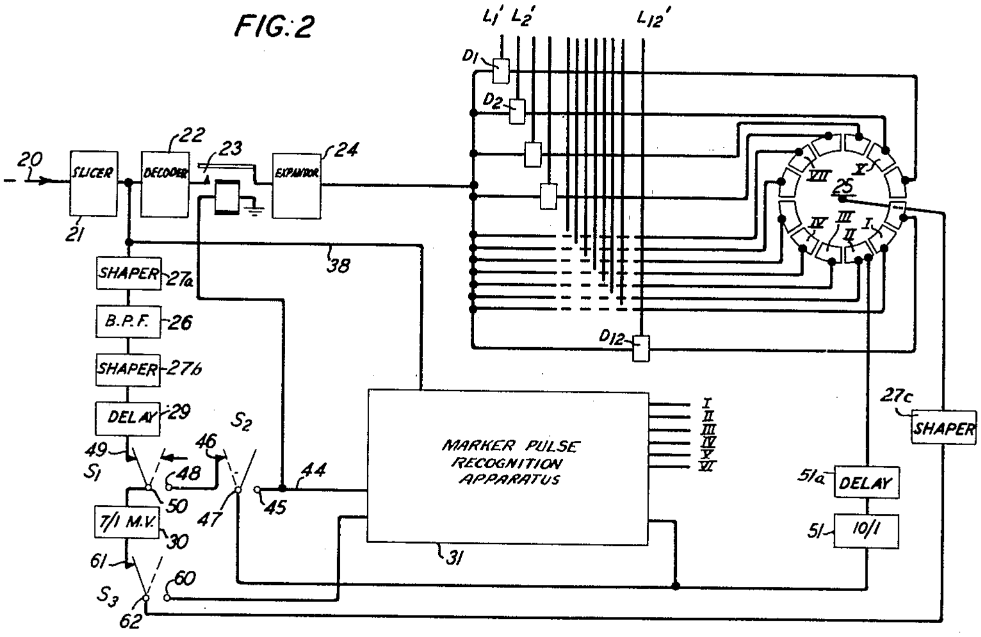
Fig. 2 is a schematic block diagram of receiver apparatus in which the invention in various forms may be embodied.

After transmission, by radio, wire, or otherwise, to a receiver station shown in Fig. 2, the incoming train of code pulses appears on an incoming line 20. Because they may have been distorted in transmission, they are first standardized in amplitude by a slicer 21 and then applied to a decoder 22. This decoder, which may be of any desired type, translates or converts each separate group of seven binary code pulses into a message sample amplitude to which it corresponds. Assuming the relay-operated switch 23 to be closed, these samples are applied to an expander 24 which corrects the amplitude distortion introduced by the compressor 8 at the transmitter station, and they are then applied together to a group of demodulators $D_1$ to $D_{12}$ which are actuated in cyclic serial order by a distributor 25, which, like that at the transmitter, may comprise a ring of multivibrators, each of which is preferably of the "flip-flop" or double stability type. A chain circuit of such double-stability units is described by C. B. Leslie in an article entitled "Megacycle Stepping Counter," published in the Proceedings of the Institute of Radio Engineers, vol. 36, page 1030 (August, 1948). Back coupling of the chain output to its input results in a ring. Thus the message amplitude samples are distributed among the outgoing lines $L_1'$ through $L_2'$. The distributor 25 may be controlled as to timing by the incoming pulse train in the following manner. A basic timing wave of 672 kilocycles is first derived from the incoming code pulses by means of a very narrow band-pass filter 26 which is tuned to the basic timing rate. Units 27*a*, 27*b* may be interposed, both ahead of this filter and following it, to give the pulses suitable shapes. After the further inerposition of a delay device 29 to balance delays in other parts of the system, the resulting 672 kilocycle pulses are applied, by way of a switch $S_1$ to a 7-to-1 frequency divider 30, for example, a multivibrator whose output pulses, assuming both of the switches $S_1$ and $S_3$ to be closed, are applied by way of a shaper 27*c* to the ring distributor 25. Thus the receiver timing and distributing networks run at exactly the same rates as the corresponding networks at the transmitter. It remains to arrange that the phases at the receiver shall exactly correspond to the phases at the transmitter in order that incoming code pulse groups may be correctly decoded and the resulting message amplitude samples correctly distributed to the several outgoing lines, and to insure that, once these phase relations have been upset either by an interruption of service or at the commencement of transmission, they shall be restored to correct alignment with a minimum of lost time. The coder 6, the decoder 22, the slice and gate circuit 9 and the slicer 21, as well as other slicers referred to in this specification, may be as described in articles published in the Bell System Technical Journal for January 1948, vol. 27, pages 1 and 44.

In the aforementioned Kreer-Peterson application, there is described a system for restoring lost phase adjustment between transmitter and receiver. The process carried out by that system involves first comparing the phase of a fixed reference pulse contained in the transmitted pulse train with a fixed reference pulse in the receiver timing frame. If these two pulses coincides the receiver is held locked to the incoming train and the system operates correctly. If they do not coincide, a progressive increase in the phase lag of the receiver with respect to the incoming train is introduced until coincidence does occur, whereupon locking takes place. The present invention provides specific improvements for accelerating the introduction of the required amount of phase lag in order that phase alignment may be restored as rapidly as possible.

The reference or marker pulse (or pulses) in the transmitted pulse sequence is (or are) preferably the same in duration and amplitude as the message code pulses, being distinguished from them only in the manner in which they recur from frame to frame. Of the three illustrative embodiments of the invention to be described in this specification, the first and the third employ several pulse positions per frame for marker pulses and the second employs a single one. Further, these marker pulse positions are preferably chosen to correspond to the least important code elements. In this way the received message quality of the channel in which a marker occurs is degraded only slightly, i. e. from seven-digit quality to six-digit quality.

Figure 1A:
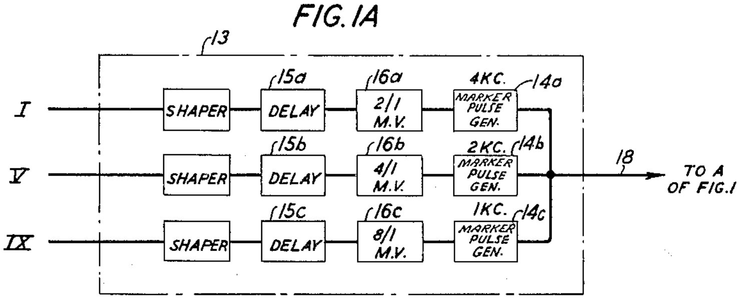

Consider the first embodiment. Here, to take an example, three marker pulses per frame are employed and they are evenly distributed, i. e., they are spaced 120 degrees apart, considering each frame to occupy 360 degrees in a cyclical process. They are distinguished from each other by the different ways in which they recur from frame to frame. Thus the first marker may recur at a 4 kilocycle rate; i. e., in alternate 8 kilocycle frames this marker position is always filled with a pulse, while in the frames between it is always blank. The second marker may recur at a 2 kilocycle rate, a pulse being present in the pulse position assigned to it only every fourth frame. Similarly, the rate at which the third marker recurs in its assigned pulse position may be 1 kilocycle. These markers are inserted in the code pulse sequence as shown in Fig. 1. Pulses are generated in the "sync control" box 13 at just such instants that when they are added to the train of code pulses at the point A, each of them masks the code pulse which may occur at this instant leaving the marker pulses recurring at their preassigned distinguishable rates. Suitable apparatus for generating the marker pulses is shown in Fig. 1*a*. Each of the three marker pulse generators 14*a*. 14*b*, 14*c* is driven by a train of 8 kilocycle pulses derived from one stage of the ring 1, and the ring stages thus serving the several generators are spaced 120 degrees apart Thus stage I serves the 4-kilocycle generator, stage V serves the 2 kilocycle generator, and stage IX serves the 1 kilocycle generator. The actual connections between the appropriately labeled points of the ring 1 and the sync control box 13 have been omitted to simplify the drawing. This angular spacing of the controlling ring stages provides roughly the correct relative timing. Precise timing for each marker pulse generator is obtained by the use of separate delays 15*a*, 15*b*, 15*c* in each generator circuit. These several 8 kilocycle pulse trains, selectively phased at 120-degree intervals as described, are applied, respectively, to a 2-to-1 frequency divider 16*a*, a 4-to-1 frequency divider 16*b*, and an 8-to-1 frequency divider 16*c*. The output pulses of these several frequency dividers, each of which may be a multivibrator, are employed to control the several marker pulse generators 14*a*, 14*b*, 14*c*, each of which may likewise be a multivibrator or other appropriate apparatus, as desired. The nominal frequencies of these multivibrators are adjusted to be approximately 4 kilocycles, 2 kilocycles, and 1 kilocycle, respectively. Their output pulses, correctly phased and timed in the manner described, are mixed on a conductor 18 and injected into the outgoing pulse train at the point A.

Coming now to the receiver, the basic network has already been described. For the purposes of the first embodiment of the invention, the apparatus of Fig. 3 fills the marker pulse recognition apparatus box 31 of Fig. 2. The required reference timing pulse is termed a "sync gate pulse" and is generated with a recurrence rate of 8 kilocycles by a generator 32 controlled by the output of stage I of the receiver ring 25. This sync gate pulse is applied to the control terminal 33 of a sample-and-hold circuit 34 which may be, for example, an electronic switch of conventional variety or a transistor switch as shown, for example, in A. J. Rack Patent 2,476,323, though it is shown symbolically as a simple switch, and to one conduction terminal 35 of which is connected a holding condenser 36. The other conduction terminal 37 of the switch 34 is supplied by way of a conductor 38 from the output of the slicer 21 (Fig. 2) so that it receives the pulses of the incoming train after slicing. The switch 34 is normally open, and is intermittently closed for a brief instant by application of the synchronizing gate pulse from the generator 32. This pulse is about 0.25 microsecond in duration. The action of the delay device 39 is to locate it in the center of a code pulse position which is about 1.5 microseconds wide. Thus through the agency of the sample-and-hold circuit 34, the synchronizing gate pulse tests one single code pulse position in each 8 kilocycle frame. If a code pulse is present in this pulse position, a charge is stored on the condenser 36 and is held for one frame period. If no pulse is present in this position in the following frame, the previous charge is quickly dissipated.

In case the synchronizing gate pulse is sampling the first marker pulse position, which may be designated $F_1$, then the condenser 36 is charged and discharged in alternate frames. Thus a voltage having a large 4 kilocycle fundamental component appears across it. A filter 41*a*, whose pass band is centered at 4 kilocycles, is connected to this condenser 36 and receives the voltage of this alternating charge. Thus, at its output, a voltage builds up. When rectified by block 42*a* and filtered by block 43, this output appears as a negative voltage on the conductor 44. Returning to Fig. 2, this negative voltage is applied to the control terminal 45 of a switch $S_2$ to hold it open. One conduction terminal 46 of this switch is connected to the control terminal 48 of another switch $S_1$ so that when $S_2$ is held open, $S_1$ is closed, while when $S_2$ is allowed to close, a path is established by way of its conduction terminals 46, 47 from a 10-to-1 frequency divider 51 to the control terminal 48 of the switch $S_1$. The conduction terminals 49, 50 of this switch are connected in series with the path by which the incoming pulse train controls the ring distributor 25. Thus when the synchronizing gate pulse coincides in time with the $F_1$ marker pulse, this path, and consequently the phase alignment of the receiver timing apparatus are undisturbed, and correct decoding and message sample pulse distribution result.

When, instead, the synchronizing gate pulse coincides in time with, and therefore tests, one of the pulse positions of the incoming train to which no marker pulse is assigned, then the charges on the condenser 36 occur in a random fashion from frame to frame, so that the output of the filter 41*a* is very much reduced, as compared with its output when the marker pulse $F_1$ is tested. Under these conditions the switch $S_2$ remains closed in the position indicated on the drawing by the broken line. This establishes a control signal path from the 10-to-1 frequency divider 51, which, like the other frequency dividers, may be multivibrator, to the control terminal 48 of the switch $S_1$. The frequency divider 51 is operated by the pulse output of one stage of the ring distributor 25 and therefore delivers a pulse once in every ten ring revolutions of the distributor, and this pulse opens the switch $S_1$ for a single code pulse position period. A delay device 51*a* may be included in this path to compensate for delays in other parts of the system, thus bringing the pulses applied to the control terminal 48 of the switch $S_1$ into time coincidence with the particular ones of the 672-kilocycle pulses which control the tripping of the 7-to-1 stepdown multivibrator 30. Opening of this switch $S_1$ breaks the path by which the incoming pulse train, by way of the 7-to-1 frequency divider 30, controls the ring distributor 25. This causes the outputs of all the apparatus which follows, namely the 7-to-1 frequency divider 30, the ring distributor 25, and the synchronizing gate pulse generator 32, to be delayed by just one code pulse interval. Thus, when the synchronizing pulse next tests the incoming pulse train, it tests a pulse position which is removed by one pulse interval with respect to the one previously tested. If after this new pulse position has been tested for ten frames the output of the filter 41*a* has not yet built up, then the pulse position tested does not contain the marker and the switch $S_1$ is again opened for a single pulse interval, again causing the testing process to be applied to the next adjacent pulse position, and so on until the marker pulse is reached, whereupon the switch $S_2$ is again opened, allowing the switch $S_1$ to remain closed without interruption, thereby terminating the phase adjustment process.

When the receiver is correctly phased with respect to the transmitter, a negative voltage appears on conductor 44 as shown above. This voltage, in addition to holding switch $S_2$ open, also operates the relay switch 23, thereby establishing the path from the decoder 22 to expander 24. This switch is open during hunting to prevent the delivery of incorrect samples to the detectors $D_1$ to $D_{12}$ and so to the outgoing subscribers' lines.

So far this process is the same as that described in the specification of the above-mentioned Kreer-Peterson application, and further details of its operation may be found by referring to that specification. In accordance with the embodiment of the invention which is presently being described, the process of hunting through the frame for the correct phase alignment is accelerated by the employment in the incoming pulse train of a plurality of distinguishable marker pulses, for example three, instead of one. The relation of each of these to the others is fixed and known. For example with three, the auxiliary marker pulses $F_2$ and $F_3$ may be angularly spaced at intervals of 120 degrees from the main marker pulse $F_1$, as described above, and as indicated in Fig. 3A. Thus if in the hunting process just described the synchronizing gate pulse tests the marker $F_2$, then it is known that the introduction of just 240 degrees, or two-thirds of a frame, will bring the receiver into correct phase alignment with the transmitter.

To this end two additional filters 41*b* and 41*c* are provided, with their input terminals connected in parallel with the input terminal of the filter 41*a*. Each is provided with a rectifier 42*b*, 42*c*, as described in connection with the main marker filter 41*a*, and the output terminals of these rectifiers are all connected in parallel and, by way of the low-pass filter 43, to the conductor 44 and so to the control terminal 45 of the switch $S_2$. The pass bands of the two additional filters are centered at the frequencies of the markers $F_2$ and $F_3$; in the present example at 2 kilocycles and 1 kilocycle, respectively.

Suppose, now, that the search for a marker is in progress, each successive pulse position of the incoming train being tested for ten frames as described above. Suppose that in the course of this search the synchronizing gate pulse should coincide in time with the $F_2$ marker. The test of the pulse position in which it occurs yields a positive result, the output of the filter 41*b* builds up, is rectified and filtered, and opens the switch $S_2$, thus stopping the step-by-step search just as in the case of the $F_1$ marker pulse. But in addition, when it is the $F_2$ marker pulse which is discovered, another path is also affected. The output of the filter 41*b* passes by way of an amplifier and rectifier 55*b*, a low-pass filter and a shaper 56*b* to a single-trip multivibrator 57*b* and trips it. This single-trip multivibrator 57*b* is adjusted to deliver a pulse whose duration is two-thirds of a frame. This pulse is applied by way of a buffer stage 58*b* to the control terminal 60 of a switch $S_3$ whose conduction terminals 61, 62 are connected in series with the control pulse path to the ring 25. The opening of this switch $S_3$ for two-thirds of a frame completely blocks the ring-driving pulses in an unbroken sequence for two-thirds of a frame, e. g., 8 successive ring-driving pulses or fifty-six successive code pulses. This withholding of the driving pulses from the ring causes it to pause during the full time, and so retards the receiver phase with respect to the transmitter phase by two-thirds of a frame, thus bringing the synchronizing gate pulse into coincidence with the main marker pulse $F_1$, whereupon the driving pulses are again applied to the ring 25 and synchronous operation is reestablished. As explained above, this condition holds until an interruption of transmission occurs.

The connections of the second auxiliary band filter 41*c* and its associated apparatus, and the operation of these components when the step-by-step search uncovers the marker $F_3$ may be wholly similar to those described above, with the exception of the fact that the single-trip multivibrator 57*c* is adjusted to deliver an output pulse whose duration is one-third of a frame, e. g., four ring driving pulses, twenty-eight code pulse positions. Finding the marker $F_3$ thus opens the switch $S_3$ and interrupts the ring drive for an interval corresponding to twenty-eight adjacent code pulse positions in unbroken sequence, and so introduces a pause in the operation of the ring for this time and retards the phase of the receiver by 120 degrees, thus bringing the synchronizing gate pulse into coincidence with the main marker $F_1$.

Figure 3:
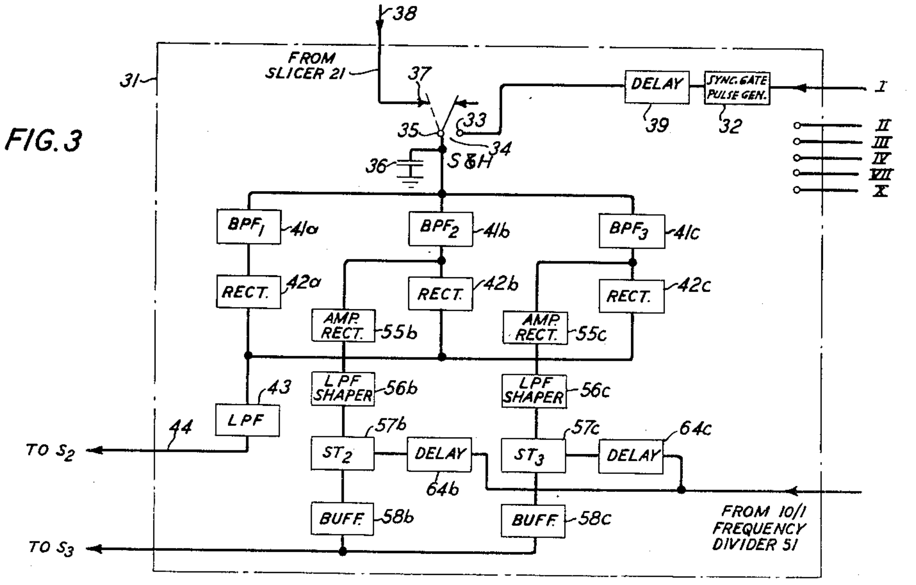
Figs. 3, 4 and 5 are schematic block diagrams illustrating the invention in various of its forms.
Figure 3A:
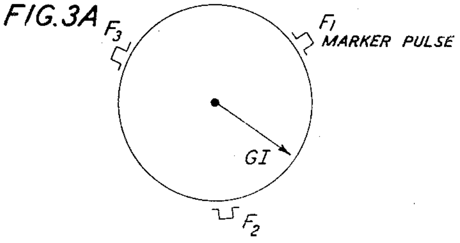
Figs. 3*a*, 4*a* and 5*a* are cyclic time diagrams illustrating time relation involved in the carrying out of the invention.

The relation of the three marker pulses and the synchronizing gate pulse are shown in Fig. 3*a*, where the circle represents one frame in the cyclic repetition of the marker and gate pulses. In this representation, the pointer GI, which corresponds to the synchronizing gate pulse, is to be regarded as rotating slowly in small jumps until it reaches a marker pulse, and as then turning very quickly to the main marker $F_1$.

The band widths of filters 41*b* and 41*c* are such that several frames elapse before their outputs have died away. In order to prevent an additional undesired tripping of either of the single-trip multivibrators 57*b* or 57*c* because of the continued presence of this output, these multivibrators may be gated by a pulse at a suitable rate, for example 800 cycles per second, derived, for example, from the 10-to-1 frequency divider 51, and adjusted in time by delay units 64*b*, 64*c*. The time between these pulses is sufficient to allow the filter outputs to die away. Another method of preventing multiple operation of the multi-vibrators 57*b*, 57*c* is to interpose ahead of each one another one whose output pulse duration is longer than the time required for the outputs of the filters 41 to die away.

By means of the system just described, the slow searching process in which each successive code pulse position is sampled for ten frames is restricted to at most one-third of a frame. With a frame of eighty-four pulse positions, this requires a time of $$\frac{84}{3}\times 10$$

frames. The remaining phase adjustment is then accomplished in either one-third or two-thirds of a frame. In this way the automatic synchronization is speeded up by a factor equal to the number of distinguishable marker pulses, e. g., a factor of three for the example discussed.

Figure 1B:
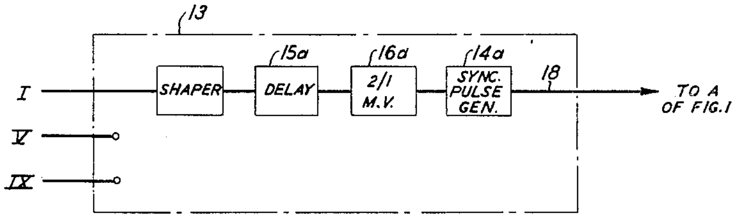
Figure 4:
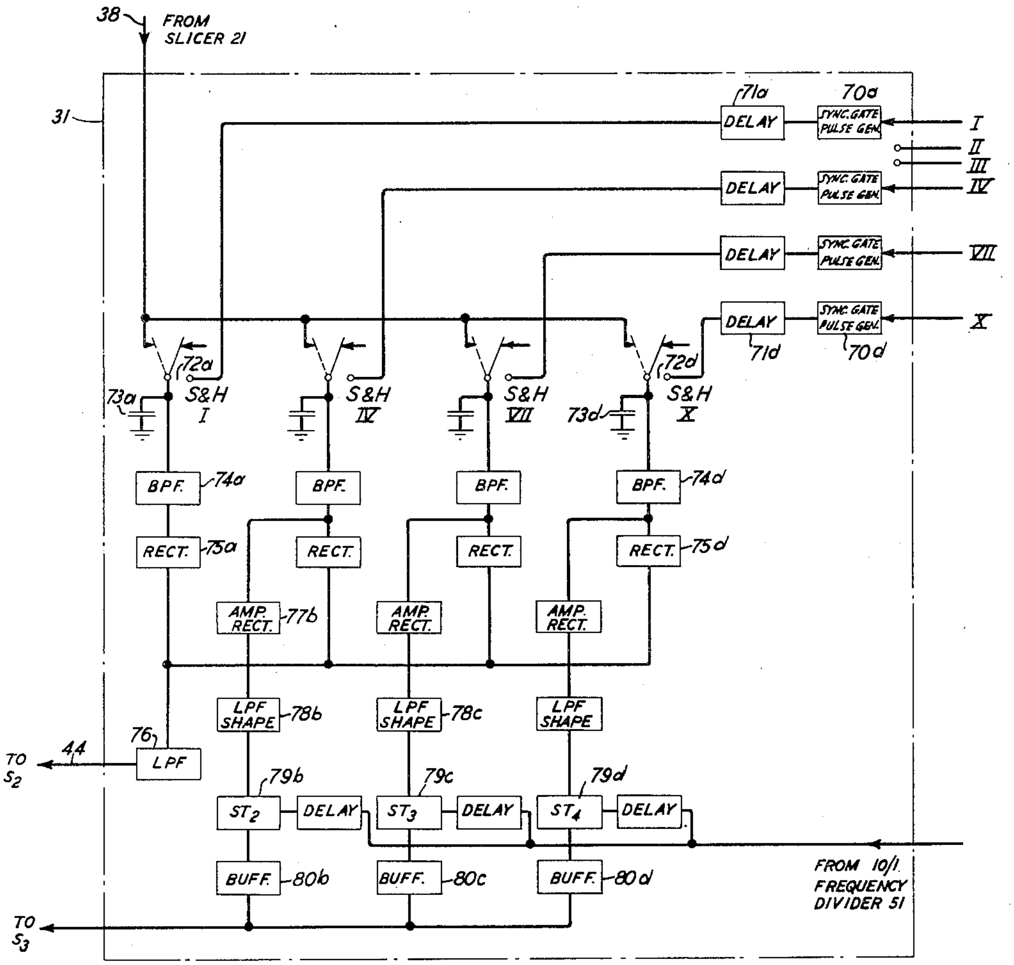

A second embodiment of the invention serving to speed up the searching process is illustrated in Fig. 4, which now occupies the Marker pulse recognition apparatus box 31 of Fig. 2. There is now required only a single marker pulse in each transmitted pulse frame, and the transmitter apparatus may be that of the above-mentioned Kreer-Peterson application, i. e., the synchronizing control box 13 of Fig. 1 may contain merely the main marker pulse generator apparatus 14*a*, 15*a*, 16*a*, as indicated in Fig. 1*b*. Instead of a plurality of distinguishable transmitted marker pulses, there are now employed a plurality of distinguishable synchronizing gate pulses generated at the receiver and evenly distributed throughout each frame. As in the previous embodiment, the slower pulse-by-pulse hunting process proceeds for only a fraction of a frame, the remainder of the phase adjustment being accomplished in a single jump.

Referring to Fig. 4, four synchronizing gate pulse generators 70*a* to 70*d* are provided, each followed by a delay device 71*a* to 71*d*. The several generators 70 are driven by output pulses of four different stages of the ring distributor 25 which are spaced apart in phase by 90 degrees. With the twelve-stage ring of the example, this means every third ring stage, for example stages I, IV, VII and X. The four synchronizing gate pulses thus generated and accurately located on the time scale, i. e., each one in the center of a 1.5 microsecond pulse interval, are applied, respectively, to the control terminals of four sample-and-hold units, each of which may comprise a switch 72 and a holding condenser 73 as in the case of the unit of Fig. 3. These units may be the same in construction as the unit 34 of Fig. 3. The incoming pulse is applied by way of the conductor 38 to one conduction terminal of each of these switches, as before; and, as before, the other conduction terminal of each switch is connected to a band-pass filter 74 whose output is connected to a rectifier 75. The output terminals of these rectifiers 75 are connected to a low-pass filter 76 which feeds the control terminal 45 of the switch $S_2$. Inasmuch as only one marker pulse is employed, the band-pass filters 74 may all be tuned to the same frequency, e. g. 4 kilocycles per second. The four synchronizing gate pulses thus test four different pulse positions in each frame for the presence of the marker pulse. Suppose it is not found. Then, after the lapse of ten frames, a single pulse is blocked by the momentary opening of the switch $S_1$, and the receiver apparatus drops back one notch, as described above in connection with Fig. 3. These operations are repeated until some one of the four synchronizing gate pulses coincides in time with the marker pulse $F_1$. When this coincidence occurs, one of the sample-and-hold switches 72, on being closed by the synchronizing gate pulse, places a charge on its holding condenser 73 on alternate cycles. The resulting regularly varying condenser charge is applied to the appropriate band-pass filter 74 whose output builds up. This output, in the case of all of the filters, operates the switch $S_2$, as above described, thus halting the pulse-by-pulse searching process. In addition, after amplification, rectification and shaping by the units 77 and 78 as above described, the output of each of the filters 74 with the exception of the first operates a single-trip multivibrator 79. These several multivibrators are adjusted to deliver pulses whose durations are three-quarters (63 code pulses), one-half (42 code pulses), or one-quarter (21 code pulses) of a frame (of 84 pulses), respectively. The outputs of these multivibrators, after being isolated from each other by buffers 80, are applied to the control terminal 60 of the switch $S_3$. Suppose, for example, that the second synchronizing gate pulse finds the marker pulse. Then the multivibrator 79*b* is tripped and $S_3$ is opened for sixty-three code pulse positions in unbroken sequence. This causes the operation of the ring 25 to pause for three-quarters of a frame, thereby bringing the No. 1 synchronizing gate pulse into coincidence with the marker pulse and synchronizing the system. Similarly for the other synchronizing gate pulses and their respective single-trip multivibrators 79c and 79d. In each case a pause is introduced in the operation of the ring 25 for a number of pulse position intervals in unbroken sequence and of just such duration as to bring the No. 1 synchronizing gate pulse, generated by the unit 70a, into coincidence with the marker. As before, unwanted multiple operation of the single-trip multivibrators 79b, 79c, 79d, may be prevented by the application to them of properly timed pulses of a suitable low frequency, for example 800 cycles per second, derived from the 10-to-1 frequency divider 51.

Figure 4A:
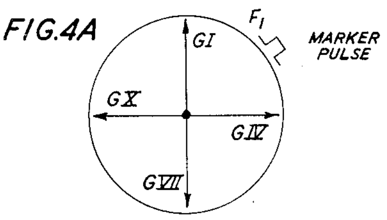

The relation between the single marker pulse and the multiple synchronizing gate pulses of this embodiment is illustrated in Fig. 4a. During the slower pulse-by-pulse hunting process the star representing the phases of the synchronizing gate pulses rotates slowly within the circle until one of them finds the marker. Thereupon the star rotates rapidly to the position in which the star point GI coincides with the marker.

This embodiment reduces the time spent in the slower pulse-by-pulse hunting process, and therefore the time required to restore phase alignment once lost, by a factor equal to the number of distinguishable synchronizing gate pulses employed, i. e., in the example chosen, by a factor of four.

A third embodiment of the invention combines the features of the previous two. It reduces still further the fraction of the frame in which the slower hunting process takes place, and by far the larger part of the phase realignment takes place in two fast steps.

Figure 5:
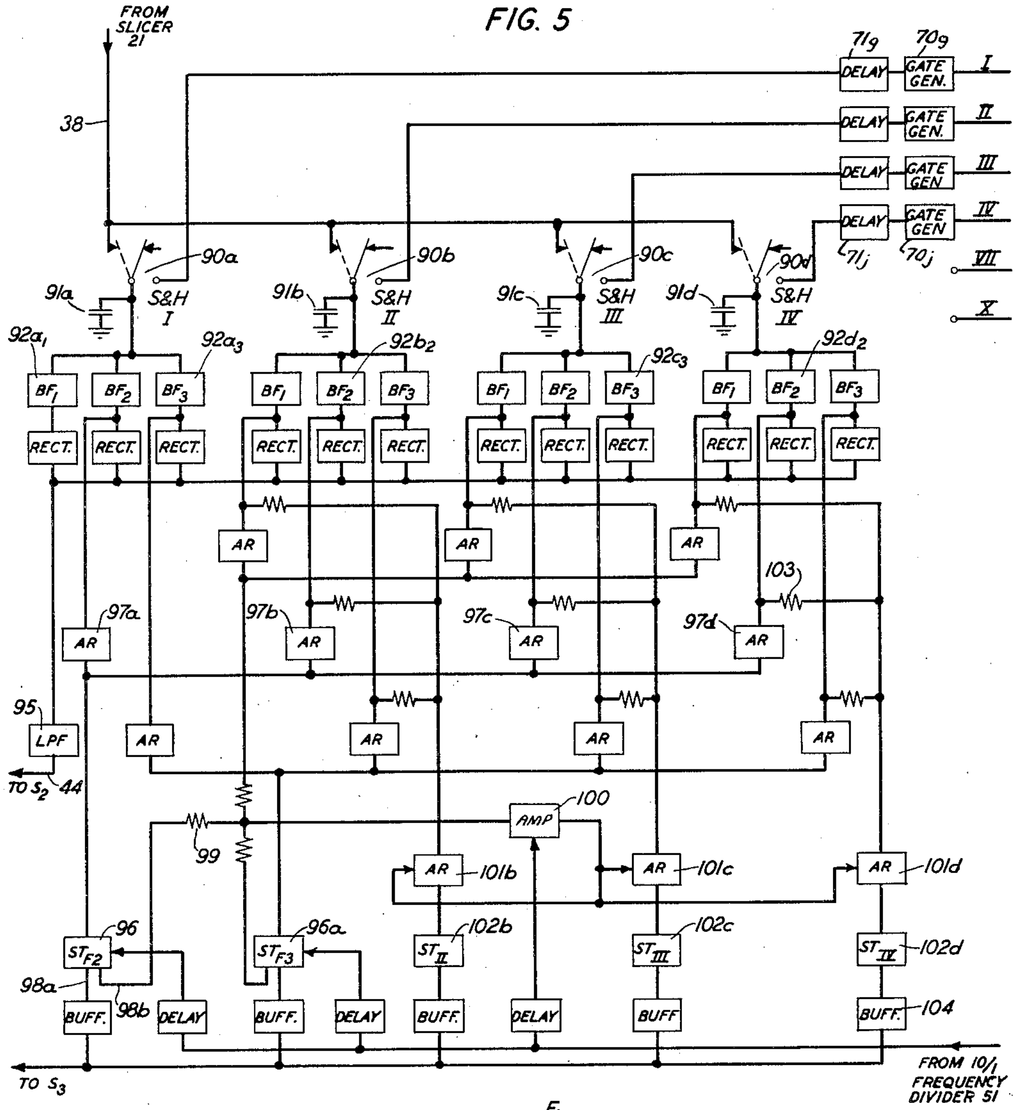
Figure 5A:
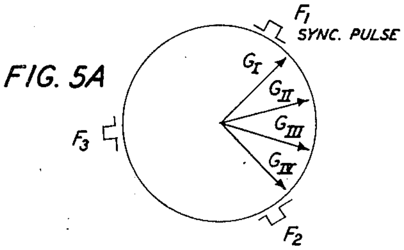

Fig. 5 shows the apparatus which now fills the marker pulse recognition apparatus box 31 of Fig. 2. As with Figs. 1a and 3, several marker pulses per frame are inserted at the transmitter, and, as with Fig. 4, several synchronizing gate pulses are employed at the receiver. In the example taken to illustrate this embodiment, i. e., three marker pulses and four synchronizing gate pulses, the slow hunting process is reduced to less than one-twelfth of a frame. Referring first to the cyclical diagram of Fig. 5a, the lines representing the synchronizing gate pulses rotate within the circle until the arrow GI, which represents the No. 1 gate pulse finds the marker $F_1$. At first this rotation is slow, occurring in short jumps of one pulse position interval at a time, with the time between jumps being ten frame periods. When, in the case shown in the diagram, the gate pulse GIV reaches the marker $F_2$, it is rapidly rotated through two-thirds of a frame to $F_1$. Then it is further rotated one-fourth of a frame, bringing GI into coincidence with marker $F_1$, which is the desired result. The means for carrying out this process which has just been described in a symbolic manner comprise a combination of those employed in the first embodiment with those employed in the second embodiment, together with some additional controls.

The multiple marker pulses are produced in the same way as in the first embodiment, with Fig. 1a filling the "sync control" box 13 of Fig. 1. The four synchronizing gate pulses are spaced 30 degrees apart and so are generated from four adjacent stages I, II, III and IV of the receiver ring 25, small delays derived from delay units 71g to 71j being interposed for precise adjustment of angular position. Each of the sample-and-hold circuits 90, 91, each of which may be similar to the unit 34 of Fig. 3, is operated by one of these gate pulses and feeds a bank of band-pass filters, as in Fig. 3. One filter in each bank is centered at the recurrence rate of the corresponding marker pulse as before. As may be seen in the figure, when any one of the four gate pulses samples any one of the three markers, the output of one of the filters builds up and is rectified.

Inasmuch as the output terminals of all of the rectifiers are connected together and to the low-pass filter 95, the voltage developed in any one of them operates the switch $S_2$ and so puts a stop to the slower pulse-to-pulse hunting process, in the manner described above. Taking the situation in which the No. IV synchronizing gate pulse finds the marker $F_2$, the filter output to build up is that of the second filter 92d2 in the bank connected to the No. IV sample-and-hold circuit 90d. This trips the multivibrator 96 whose input terminals are connected in multiple to all of the $BF_2$ filters by way of isolating amplifiers and rectifiers 97 and which is arranged to deliver output voltages in opposite phase on two conductors 98a, 98b, respectively. By reason of its return-time adjustment, this multivibrator 96 generates pulses whose durations are two-thirds of a frame. The positive pulse on conductor 98a is applied by way of a buffer 99 to the control terminal 60 of the switch $S_3$ as before, thus causing all of the operations at the receiver to be delayed for two-thirds of a frame. At the start of this period, the output pulse from the other side of the multivibrator 96 is applied by way of the conductor 98b and by way of a padding resistor 99 and an amplifier 100 to amplifier-rectifier units 101b, 101c, 101d which precede the multivibrators 102b, 102c and 102d. These amplifier-rectifier units are so biased as to be held in disabled condition until, at the termination of the two-thirds frame period determined by the unit 96, the polarity of its voltage output on the conductor 98b reverses, thus overcoming the disabling bias and so enabling the units 101b, 101c and 101d precisely at this instant. In the example being considered, the voltage which has built up in the output of the filter 92d2 which is supplied by sample-and-hold unit 90d is then applied by way of a pad 103 and the (now enabled) amplifier-rectifier unit 101d and trips the multivibrator 102d. Upon being tripped, this multivibrator generates a pulse whose duration is one-fourth of a frame. This pulse, which commences upon the termination of the previous period of two-thirds of a frame, is applied by way of a buffer 104 to the control terminal of the switch $S_3$ to hold it open at the instant at which it would otherwise have closed. Thus a further pause of one-quarter frame is introduced in the receiver operations, causing the receiver phase to be further retarded by 90 degrees, thus bringing the synchronizing gate I pulse into coincidence with marker $F_1$, which is the correct relation for proper operation of the system.

If $F_1$ is the first marker pulse to be sampled, the output of one of the filters enables the amplifiers 101b, 101c, 101d immediately so that one of the multivibrators 102b, 102c, 102d is tripped without awaiting the termination of any prior pulse period from unit 96 or 96a. In this case, of course, the fast stage of phase adjustment includes only one step. As before, the single-trip multivibrators 96, 96a are gated by properly timed 800-cycle pulses in order to prevent multiple tripping. Resistance loss pads are introduced as shown to isolate the inputs of multivibrators 102b, 102c and 102d from the inputs of multivibrators 96 and 96a. Another pad serves to isolate the outputs of these multivibrators from the combined outputs of the filters $BF_1$.

This last embodiment provides an acceleration factor which is the product of the two acceleration factors of the two previous embodiments.

In all three embodiments, the durations of delay pulses generated by the multivibrators 57b, 57c of Fig. 3, the multivibrators 79b, 79c and 79d of Fig. 4 and the corresponding elements of Fig. 5 must be no longer than the times specified in each circumstance above. If they are less than the specified values, no harm is done, since in this case the slow hunting process will be resumed. After hunting through a few code pulse positions, Gate I will reach marker $F_1$ and the process is finished.

The various apparatus elements shown in the drawing as blocks, and as to which constructional details have not been given in the foregoing description, may be conventional. Thus, each of the pulse shapers may comprise a common resistance-capacitance differentiating circuit. In the case of those which are fed by smooth waves, such as 3 and 27b, it is preferred to amplify and limit the waves in conventional fashion before applying them to the differentiating circuit. Differentiating circuits are shown to be thus employed for wave-shaping purposes in Electronics for August 1942, at page 48.

With the exception of the delay device 51a, each of the various short-time delay devices shown may comprise a reactive electromagnetic transmission line, whose length is selected to give, in terms of the propagation speed along the line, the required time delay. Lines which have been found by test to be entirely suitable are described in the Proceedings of the I. R. E., vol. 34, page 348 (June 1946).

The delay device 51a is required to provide a delay which, if generated by an electromagnetic line, would require a line of inconveniently great length. It is common in such a situation to employ as the delay device a monostable or "single trip" multivibrator of conventional construction as shown, for example in "Time bases" by O. S. Puckle (Wiley 1946) at page 59.

The pulse generators 11, 14a, 14b, 14c, 32, 70a through 70j may again be of any desired type, but a very convenient one comprises a short-circuited reflecting delay line connected in the output circuit of a buffer tube as shown, for example, in Levey et al. Patent 2,433,379. Such an arrangement is also shown in Electronics for August 1942, page 50. A conventional single trip multivibrator is for most purposes equally serviceable.

Large numbers of variants of the foregoing arrangements are shown in "Wave Forms" by Chance et al., Radiation Laboratory Series, vol. 19, especially at sections 5.5, 5.8, 5.10, 18.5, and 22.

What is claimed is:

1. In a synchronous pulse communication system which includes receiver apparatus for reconstituting a message from pulses of an incoming train, which apparatus depends for correct message reconstitution on synchronous operation of a rotative member in a preassigned phase relation with transmitter apparatus, and includes means for normally advancing said member rotationally in step-by-step fashion in synchronism with transmitter apparatus under control of pulses at the basic pulse repetition rate of said train, and means, operative when said preassigned phase relation is interrupted, for momentarily arresting the advance of said rotative member for one pulse interval and for repeating said momentary arrest until said phase relation is reestablished, means for accelerating the reestablishment of said phase relation which comprises means controlled by an output stage of said rotative member for examining each of the various pulse positions of said incoming train for the presence in that pulse position of a marker pulse, a plurality of individual means for recognizing the presence of a marker pulse in a preassigned pulse position of said train, recognition of a marker pulse by each member of said plurality being indicative of a particular degree of lag as between the phase of the incoming pulse train and the phase of the rotation of said member, means for further arresting the advance of said rotative member for a preassigned number of pulses, corresponding to a preassigned fraction of a revolution of said member, in unbroken sequence, and an energizing path extending from at least one of said individual recognizing means to said further-arresting means.

2. Apparatus as defined in claim 1 wherein the marker pulses are of several distinguishable characters and wherein each of said recognizing means is adapted to recognize pulses of one of said characters.

3. Apparatus as defined in claim 1 wherein the marker pulses are distinguishable by reason of different pulse repetition rates and wherein each recognizing means comprises a filter responsive to a frequency which is integrally related to the repetition rate of one of said marker pulses.

4. Apparatus as defined in claim 1 wherein the last-named means comprises a delay generator disposed to be actuated by each of said recognizing means, the several delay times generated by the several generators being related to the angular complements of said phase lags, means actuated by each of said generators for effecting an unbroken pause in said step-by-step advance, the duration of each of said pauses being not greater than the delay of the generator effecting it, whereby the phase lag of said receiver apparatus is increased by a plurality of pulse periods in unbroken sequence and equal in number to the number of pulse positions separating the phase condition of the receiver apparatus on receipt of the received marker pulse from the correct phase condition, and means for disabling said pause-effecting apparatus when said preassigned phase relation is correctly established.

5. In combination with apparatus as defined in claim 4, means under control of the output of each recognizing means for disabling the momentary arresting means.

6. Apparatus as defined in claim 1 wherein the last-named means comprises a delay generator disposed to be actuated by each of said recognizing means, the several delay times generated by the several generators being related to the time displacements from a specified one of said marker pulses to the others of said marker pulses, means actuated by each of said generators for effecting an unbroken pause in said step-by-step advance, the duration of each of said pauses being substantially equal to the delay of the generator effecting it, whereby the phase lag of said receiver apparatus is increased by a plurality of pulse periods in adjacent sequence and equal in number to the number of pulse positions separating the phase condition of the receiver apparatus on receipt of the received marker pulse from the correct phase condition, and means for disabling said pause-effecting apparatus when said preassigned phase relation is correctly established.

7. In a synchronous pulse communcation system which includes receiver apparatus for reconstituting a message from pulses of an incoming train, which apparatus depends for correct message reconstitution on synchronous operation of a rotative member in a preassigned phase relation with transmitter apparatus, and includes means for normally advancing said member rotationally in step-by-step fashion in synchronism with transmitter apparatus under control of pulses at the basic pulse repetition rate of said train, and means, operative when said preassigned phase relation is interrupted, for momentarily arresting the advance of said rotative member for one pulse interval and for repeating said momentary arrest until said phase relation is reestablished, means for accelerating the reestablishment of said phase relation which comprises a plurality of recognizing means, each adapted to recognize marker pulses which are interspersed in the incoming pulse train, means for momentarily enabling said recognizers in regular serial order under control of said rotative member, whereby the several recognizing means are responsive to several different conditions of phase lag of said rotative member with respect to said transmitter, means for generating any one of a plurality of pauses of different durations in the advance of said rotative member, each such pause corresponding to one of a plurality of different amounts of said phase leg, and a path extending from each of said recognizing means to said pause-generating means for selecting the pause generated in relation to that one of the recognizing means which is enabled.

8. Apparatus as defined in claim 7 wherein the last-named means comprises a delay generator disposed to be actuated by each of said recognizing means, the several delay times generated by the several generators being related to the angular complements of said phase lags, means actuated by each of said generators for effecting an unbroken pause in said step-by-step advance, the duration of each of said pauses being substantially equal to the delay of the generator effecting it, whereby the phase lag of said receiver apparatus is rapidly increased by a plurality of pulse periods in adjacent sequence and equal in number to the number of pulse positions separating the phase condition of the receiver apparatus on receipt of the received marker pulse from the correct phase condition, and means for disabling said pause-effecting apparatus when said preassigned phase relation is correctly established.

9. In a synchronous pulse communication system which includes receiver apparatus for reconstituting a message from pulses of an incoming train, which apparatus depends for correct message reconstitution on synchronous operation of a rotative member in a preassigned phase relation with transmitter apparatus, and includes means for normally advancing said member rotationally in step-by-step fashion in synchronism with transmitter apparatus under control of pulses at the basic pulse repetition rate of said train, and means, operative when said preassigned phase relation is interrupted, for momentarily arresting the advance of said rotative member for one pulse interval and for repeating said momentary arrest until said phase relation is reestablished, means for accelerating the reestablishment of said phase relation which comprises a bank of switches, $n$ in number, connected to receive the incoming pulse train, a plurality of selective elements, $m\ n$ in number, $m$ of which are connected to a conduction terminal of each one of said switches, each of said selective elements being adapted to respond to a preassigned one of a plurality of distinguishable marker pulses which are interspersed in the incoming pulse train, means for momentarily closing one of said switches under control of said rotative member thereby momentarily applying the incoming pulse train simultaneously to all $m$ selective elements connected to said switch, means under control of said rotative member for similarly closing all of said switches in regular serial order, whereby the response of each one of said selective elements is indicative of a particular one of $m\ n$ different conditions of phase lag of the rotative member with respect to the transmitter, means for generating any one of a plurality of pauses of different durations in the advance of said rotative member, each such pause corresponding to one of a plurality of different amounts of said phase lag, and a path extending from each of said selective elements to said pause-generating means for selecting the pause generated in relation to that one of the selective elements which responds.

10. Apparatus as defined in claim 9 wherein the last-named means comprises a first plurality of n-1 delay generators, each arranged to be actuated by the output of any of the $m$ selective elements connected to a single one of the $n$ switches, a second plurality of m-1 delay generators, each arranged to be actuated by any one of the corresponding group of like selective elements, the several delay times generated by the several generators being chosen to make the sums of the time of a generator of the first plurality and that of a generator of the second plurality, equal to the angular complements of said $m\ n$ different conditions of phase lag, said two generators constituting a generator pair, means actuated by each of said generator pairs for effecting an unbroken pause in said step-by-step advance, the duration of each of said pauses being substantially equal to the sum of the delays of the two generators effecting it, whereby the phase lag of said receiver apparatus is rapidly increased by a plurality of pulse periods in adjacent sequence and equal in number to the number of pulse positions separating the phase condition of the receiver apparatus on receipt of the received marker pulse from the correct phase condition, and means for disabling said pause-effecting apparatus when said preassigned phase relation is correctly established.

11. In a synchronous pulse communication system which includes receiver apparatus for reconstituting a message from pulses of an incoming train, said train including a primary regularly recurring marker pulse and a secondary regularly recurring marker pulse which is spaced from and distinguishable from the primary marker pulse, which apparatus includes primary marker pulse registering means and depends for correct message reconstitution on synchronous operation of a rotative member in a preassigned phase relation with transmitter apparatus as determined by regularly recurrent registration of said primary marker pulse by said primary marker pulse registering means, and includes means for normally advancing said member rotationally in step-by-step fashion in synchronism with transmitter apparatus under control of pulses at the basic pulse repetition rate of said train, and means, operative when said preassigned phase relation is interrupted as determined by failure of said regular registration of said primary marker pulse, for momentarily arresting the advance of said rotative member for one pulse interval and for repeating said momentary arrest until said primary marker pulse is again regularly registered and said preassigned phase relation is thus reestablished, apparatus for accelerating the reestablishment of said phase relation which comprises secondary marker pulse registering means, means for simultaneously momentarily enabling said primary means and said secondary means, a plurality of sources of pulses of unlike durations, each pulse duration being related to a preassigned phase lag between the transmitter apparatus and the rotative member, individual paths extending from at least some of said marker pulse registering means to said several pulse sources for selectively actuating said several sources in dependence on the registration of a marker pulse by the momentarily enabled pulse registering means, and means for applying the pulses of each of said sources to said rotative member to arrest its advance for an unbroken sequence of pulses occupying a time related to said phase lag.

12. In a synchronous pulse communication system which includes receiver apparatus for reconstituting a message from pulses of an incoming train, said train including a regularly recurring marker pulse, which apparatus depends for correct message reconstitution on synchronous operation of a multistage rotative member in a preassigned phase relation with transmitter apparatus as determined by regularly recurrent registration of said marker pulse and includes means for normally advancing said member rotationally in step-by-step fashion in synchronism with transmitter apparatus under control of pulses at the basic pulse repetition rate of said train, and means, operative when said preassigned phase relation is interrupted as determined by failure of said regular marker pulse registration, for momentarily arresting the advance of said rotative member for one pulse interval and for repeating said momentary arrest until said marker pulse is again regularly registered and said preassigned phase relation is thus reestablished, apparatus for accelerating the reestablishment of said phase relation which comprises a plurality of similar marker pulse registering means, individual enabling means connected to each of said marker pulse registering means, connections for applying said incoming pulse train to all of said enabling means simultaneously, paths extending individually from several of the output stages of said rotative member to the several enabling means, for enabling said marker pulse registering means in sequence, a plurality of sources of pulses of unlike durations, each pulse duration being related to a preassigned phase lag between the transmitter apparatus and the rotative member, individual paths extending from at least some of said marker pulse registering means to said several pulse sources for selectively actuating said several sources in dependence on the registration of a marker pulse by the momentarily enabled pulse registering means, and means for applying the pulses of each of said sources to said rotative member to arrest its advance for an unbroken sequence of pulses occupying a time related to said phase lag.

EUGENE PETERSON.

No references cited.